United States Patent Office

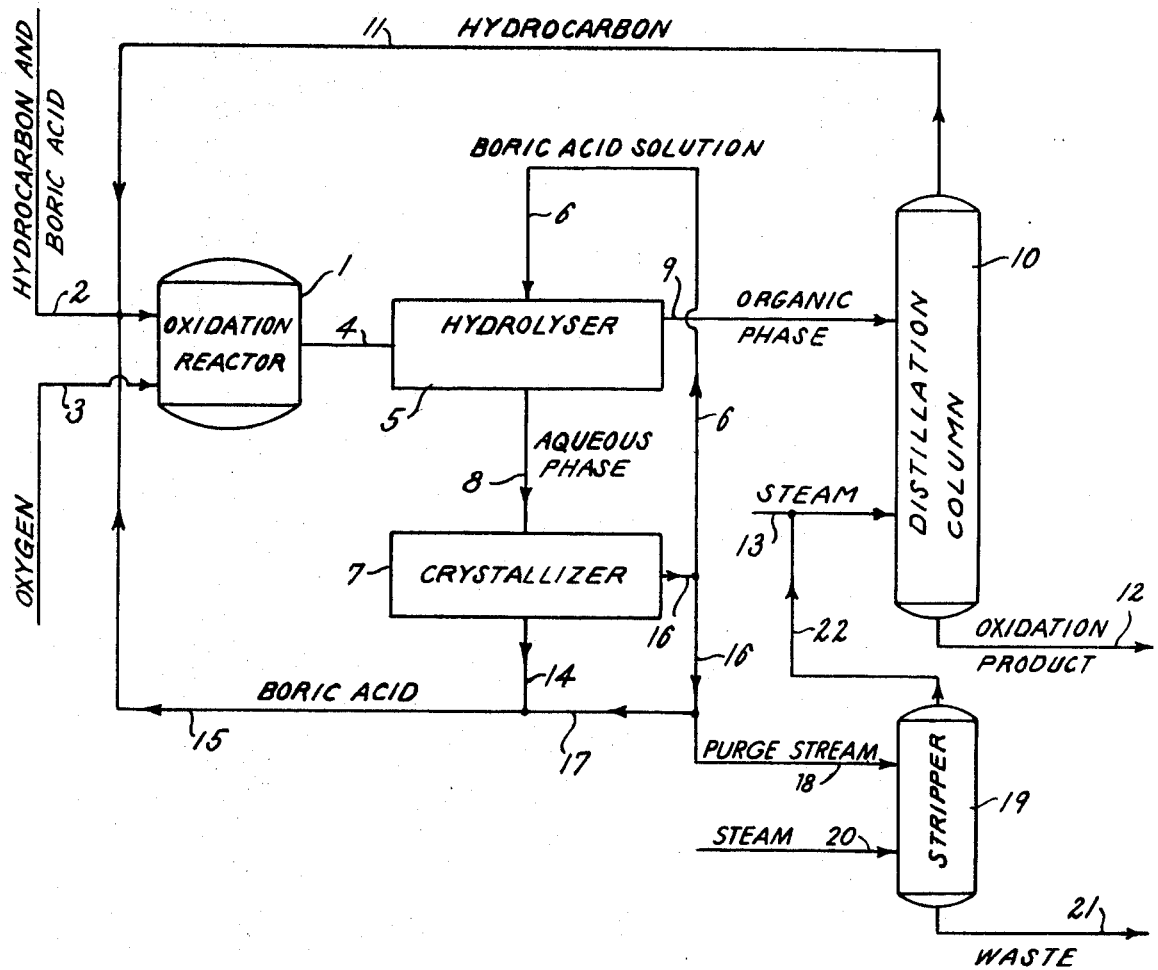

3,592,859
Patented July 13, 1971

---

3,592,859
RECOVERY OF RESIDUAL PRODUCT IN HYDROCARBON OXIDATION PROCESS
Richard L. Marcell, Bergenfield, N.J., and James Leacock, New York, N.Y., assignors to Halcon International, Inc.
Filed Jan. 17, 1967, Ser. No. 609,881
Int. Cl. C07c *31/02, 35/02, 35/08*
U.S. Cl. 260—631
6 Claims

ABSTRACT OF THE DISCLOSURE

In the oxidation of hydrocarbons, e.g., cyclohexane, in the presence of boron compounds, e.g., metaboric acid, the reaction product contains borate esters of the alcohol corresponding to the aforesaid hydrocarbon. The ester is hydrolyzed to form an aqueous phase containing boric acid and an organic phase. While a portion of the aqueous phase is dehydrated and the recovered boron compound recycled to the oxidation, a portion must be purged in order to prevent impurity accumulation which interferes with the oxidation. This purge stream, however, also contains valuable oxidation products which are lost if the purge stream is discarded. The invention is concerned with an economically feasible method of recovering these oxidation products. The purge stream is stripped to separate the effluent oxidation products and water. The effluent is added to the stream distillation column used to separate the unreacted hydrocarbons from the oxidation products in the organic phase.

---

This invention relates to an improvement in the process for the oxidation of hydrocarbons in the presence of boron compounds. More specifically, the invention teaches a technique for recovering and recycling a maximum amount of the boron compound without an undue loss of the desired oxidation products.

It is well known that hydrocarbons can be directly oxidized with molecular oxygen containing gases to produce oxygenated organic derivatives of great commercial importance. It is also known that boron compounds which esterify with alcohols formed during the oxidation are advantageously employed in such oxidations as adjuvants to provide improved selectivity in the conversion of such hydrocarbons to the desired products, most commonly the monofunctional alcohol and ketone derivatives of the hydrocarbon being oxidized. Such processes are disclosed, for example, by Winnick, U.S. Pat. No. 3,243,449.

In the commercial practice, it is readily apparent that, for the process to be economically attractive, the boron compounds must be recovered and recycled to the oxidation. While recovery of the boron compound is not difficult, it has been observed that the direct recycle of all of the recovered material is unsatisfactory, presumably because of impurities which become intermittently associated therewith. The presence and build-up of these impurities is believed to account for the continually decreasing selectivity of the oxidation reactions employing the repeatedly recycled boron compounds. The selectivity is reduced so significantly after as few as three or four recycles that the oxidation reaction becomes impractical.

It has been previously suggested that a portion of the recovered boron compounds be removed (i.e., be purged) from the recycle to the oxidation reactor and that fresh quantities be added to make up the amount required for the oxidation. This approach has been found to maintain the impurity level at the required minimum but, in addition to the boron compound purged, it has been found that a significant amount of the oxygenated products was lost in the purge stream. Attempts to economically recover these oxygenated compounds in a commercially and economically feasible manner have not hitherto been developed because of the comparatively high cost of utilities and equipment which appeared to be needed for such a recovery operation.

In accordance with this invention, it has been found that the oxygenated products present in the purge stream may be economically recovered by employing a steam stripping operation in conjunction with existing process equipment.

The figure is a flow diagram showing the major processing equipment and steps used in the practice of the invention.

To place the invention in its proper context, it is first necessary to describe the oxidation reaction. A hydrocarbon in liquid phase together with a boron compound such as meta-boric acid is charged to a reactor and contacted with a molecular oxygen containing gas at reaction conditions until the desired conversion is obtained. Usually from 5 to 15% of the hydrocarbon is converted per pass, though higher or lower conversions can be obtained. Typical oxidation temperatures are in the range from about 150° C. to about 200° C. Typical pressures are from about atmospheric to 1000 p.s.i.g., depending, for example, on the hydrocarbon, preferably 100 p.s.i.g. to about 200 p.s.i.g. The preferred boron compounds employed in such oxidation are boric acids (ortho and metaboric acids), boric acid esters (such as the ester of metaboric acid with the mono-alcohol derivative of the hydrocarbon being oxidized, e.g., cyclododecanyl meta-borate when cyclododecane is the hydrocarbon being oxidized) and boric acid anhydrides (e.g., $B_2O_3$ and $B_4O_5$). Mixtures of these boron compounds (as they are referred to hereinafter) can also be employed.

Suitable hydrocarbon feeds to the oxidation reaction are those saturated hydrocarbons having from 4 to 20 carbon atoms per molecule. This includes mixtures of such hydrocarbons. Thus, aliphatic and alicyclic hydrocarbons such as, for example, cyclohexane, methyl cyclohexane, cycloheptane, cyclooctane, dimethyl cyclohexanes, n-pentane, n-hexane, methyl pentanes, methyl butane, cyclododecane, eicosane, $C_{12}$ to $C_{14}$ petroleum naphthas and $C_{14}$ to $C_{18}$ petroleum naphthas, may be used. It is not necessary that the feed be entirely free of unsaturated materials, such as benzene, so long as the feed consists essentially of saturated hydrocarbons, i.e., more than about 95 mole percent. Similarly, small amounts of impurities, such as sulfur and nitrogen containing compounds, can also be present in the hydrocarbon feed.

Since at the present time, the most widely practiced embodiment of the hydrocarbon oxidation reaction is the oxidation of cyclohexane to a mixture of cyclohexanol and cyclohexanone, the process of the invention will be described using this reaction as an illustrative embodiment.

During the oxidation of the hydrocarbon the majority of the hydrocarbon is converted to (1) a borate ester of the corresponding monofunctional alcohol and (2) a corresponding monofunctional ketone. It is believed that an alcohol is formed during the oxidation which then esterifies with the boron adjuvant compound to form a borate ester, e.g., cyclohexyl borate. An alternate route could be for hydroperoxide to react with the boron compound to give a peroxyborate which then reacts to form borate ester. Thus, when cyclohexane is oxidized the reactor effluent contains, primarily unreacted cyclohexane, cyclohexyl borate, cyclohexanone, cyclohexyl peroxyborate or cyclohexyl hydroperoxide, and small amounts of undesirable by-products, deleterious to the later recovery and reuse of the boron compound. Such mixtures of products and unreacted feed-stock are hereinafter referred to as "borate ester-containing hydrocarbon oxidation mixtures."

The borate ester-containing hydrocarbon oxidation mixture is then hydrolyzed, thereby converting the borate ester to the free alcohol and ortho-boric acid. The main oxygenated products are recovered as product and the boric acid is recovered for recycle to the hydrocarbon oxidation.

The borate ester-containing hydrocarbon oxidation mixture is hydrolyzed by admixing it with an aqueous stream in a hydrolyzer. The resultant admixture is withdrawn from the reactor after the hydrolysis is substantially complete and it is separated into an aqueous phase and an oxygenated organic phase containing the desired oxygenated products, viz, cyclohexanol and cyclohexanone, together with unreacted cyclohexane. These oxygenated products are separated from the unreacted cyclohexane in a steam distillation column, the latter being recycled to subsequent oxidations. The aqueous phase is formed from the water which is added in excess of the stoichiometric amount required for hydrolysis. If sufficient water is used, all of the boric acid is dissolved with the bulk of it being in the aqueous phase; otherwise a portion thereof precipitates as a solid. Also present in this aqueous phase are impurities which, if returned to the oxidation zone, interfere with the oxidation reaction as above mentioned.

Returning to the instant invention, from 2 to 40%, preferably about 15 to 30%, of the stream 8 aqueous phase must be withdrawn in order to maintain a suitably low impurity level in the oxidation reactor. This purge stream is passed to the stripper. The stripper preferably operates at a pressure of from 3 to 40 p.s.i. in excess of that employed in the existing steam distillation column (the column 10 used to separate the unreacted hydrocarbon in the organic phase). These pressures range from 1.2 to 5.0 atms. at temperatures from 50 C. to 105° C. for the distillation column and 1.4 to 5.2 atms. at temperatures from 110 C. to 155° C. for the stripper depending on the particular oxidation. The overhead fraction from the stripping column contains substantially all of the cyclohexanol and cyclohexanone in the purge in addition to steam which has either been added to or evolved in the stripper. This fraction is fed directly to the distillation column along whit the additional steam required for this latter distillation. The oxygenated products from the purge stream are readily recovered in combination with the main portion of the oxygenated products from the bottom of the steam distillation column. Hence, product which would otherwise be lost is recovered merely by the addition of a stripper. This is a surprising result in light of the apparent complexity of separating the oxygenated products from water, impurities and the dissolved boron compound.

While not essential, it is preferred to add steam to the stripper to facilitate the stripping action. The steam is added at a comparatively high stripper pressure and is fully usable in the subsequent steam distillation. Since the purge stream is primarily water, the steam may be generated in situ by providing the stripper with a reboiler.

In order to illustrate the invention more fully attention is directed to the attached figure. A slurry of the boron compound in the hydrocarbon is introduced into reactor 1 via line 2. The reactor is brought to the appropriate temperature and pressure and molecular oxygen, introduced via line 3, is bubbled through the slurry. During the reaction appropriate measures are taken to maintain the minimum of water vapor in the reaction zone. Such procedures are disclosed in U.S. Pat. 3,243,449.

The effluent from the reaction zone containing (1) boron esters of the oxidized hydrocarbons, (2) unrecated hydrocarbon, and (3) impurities passes via line 4 to hydrlyzer 5. In the hydrolyzer 5 the borate esters are hydrolyzed to boric acid and the alcohol by the addition of a saturated aqueous solution of boric acid introduced via line 6. The product of hydrolysis separates into an upper organic phase and a lower aqueous phase containing boric acid and small amounts of impurities and oxygenated products. The latter phase passes to the crystallizer 7 via line 8. The organic phase from the hydrolyzer 5, containing the unrecated hydrocarbon in addition to the bulk of the oxygenated products, is passed via line 9 to the steam distillation column 10. Make-up steam is supplied via line 13. In column 10 the unreacted hydrocarbon is stripped from the other oxidation products, removed overhead via line 11, and recycled to the oxidation reactor 1. The oxidation products are removed from the bottom of the column 10 via line 12 and subjected to subsequent refinement.

In the crystallizer 7 solid boric acid is separated via line 14. The boric acid is of comparatively high purity and may be recycled, if desired, to the oxidation reactor via line 15. Removed as mother liquor from the crystallizer 7 via line 16 is a saturated aqueous boric acid solution. The mother liquor is divided into three separate portions. As previously noted, one portion is recycled to the hydrolyzer 5 via line to hydrolyze the borate ester. A second portion is recycled via lines 17 and 15 back to the oxidation reactor 1 where it may be reused. It should be understood that both the solid boric acid and the aqueous boric acid solution must be dehydrated prior to use. This may be done either in the oxidation reactor 1 or in a separate dehydrator (not shown).

According to the teaching of the invention the third portion of the mother liquor is purged via line 18 and fed to stripper 19. Stream 18 is primarily water and contains some oxygenated hydrocarbons which are entrained and dissolved in the aqueous phase in the hydrolyzer 5. Steam is passed to the stripper 19 via line 20 at a suitable temperature and pressure. Withdrawn from the bottom of the stripper 19 is a boric acid solution containing impurities which is discarded from the process via line 21. An overhead stream 22 is withdrawn from the stripper 19 containing the alcohol and ketone products and steam, which is still at a pressure and temperature sufficient for use in the hydrocarbon distillation column 10. Stream 22 is passed to the hydrocarbon distillation column 10 along with the make-up steam introduced via line 13. The oxygenated hydrocarbons are combined with those passed to the hydrocarbon distillation column 10 via line 9 and removed as product via line 12.

The following example is a preferred embodiment of the invention:

The aqueous phase obtained after hydrolysis of a borate ester-containing hydrocarbon mixture and containing 19.7 parts of cyclohexanol and cyclohexanone, 736.0 parts of water, 81.3 parts of boric acid, and 163.0 parts of nonvolatile oxygenated materials are passed to a stripper at 50° C. Additionally 290 parts of steam at a temperature of 131° C. and a pressure of 25 p.s.i.g. are passed to the stripper.

Separated from the bottom of the stripper and discarded are 1111.9 parts of water, boric acid and nonvolatile oxygenated materials, and 1.1 parts of cyclohexanol and cyclohexanone. Withdrawn overhead from the stripper at a temperature of 110° C. and a pressure of 23 p.s.i.g. are 196.4 parts of steam and 18.6 parts of cyclohexanol and cyclohexanone; about 38 parts of process water are fed to the stripper as reflux. The overhead stream is passed to the cyclohexane distillation column after the addition of 107 parts of make-up steam. In addition to the aforesaid stream, 850 parts of cyclohexane and 2130 parts of oxygenated materials are passed to a 30 tray distillation column at a temperature of 110° C. The overhead from this distillation column contains 850 parts of cyclohexane which is recycled to the subsequent oxidation. This stream is at a temperature of 75° C. and a pressure of 18 p.s.i.g. Oxygenated materials are removed from the bottom of the column and sent to subsequent purification. The stream contains 1676 parts of cyclohexanol and 187 parts of cyclohexanone in addition to 285 parts of impurities. An analysis of the material balance shows that essentially all of the oxygenated material in the stripper overhead is recovered from the bottom of the column 10.

Having thus described our invention, what we claim and desire to protect by Letters Patent is:

1. In a process for the oxidation of a saturated aliphatic or alicyclic hydrocarbon having 4 to 20 carbon atoms per molecule with a gas containing molecular oxygen in the presence of a boron compound, wherein the effluent from the oxidation contains unreacted hydrocarbon and borate esters of the corresponding alcohol, wherein the effluent is hydrolyzed with water to form an organic phase containing unreacted hydrocarbon and the bulk of said alcohol and an aqueous phase containing said boron compound and residual amounts of said alcohol, wherein said boron compound is recovered by crystallization, wherein a portion of the saturated aqueous boric acid mother liquor recovered from crystallization is purged, and wherein said organic phase is passed to a distillation zone to separate said unreacted hydrocarbons from the bulk of said alcohol, the improvement which comprises subsequent to said crystallization, steam stripping at least a portion of said purged saturated aqueous boric acid mother liquor in a stripping zone and passing the vapors obtained from the stripping zone to said distillation zone, thereby separating said residual amounts of the alcohol along with the bulk of the alcohol.

2. The process of claim 1 wherein the stripping zone is at a pressure of at least 3 p.s.i. greater than said distillation zone.

3. The process of claim 1 wherein from 2 to 40% of said saturated aqueous boric acid mother liquor is passed to said stripping zone.

4. The process of claim 1 wherein said hydrocarbon is cyclohexane.

5. The process of claim 4 wherein the stripping zone is at a pressure of from 21 to 76 p.s.i.g. and a temperature of 110 to 155° C.

6. The process of claim 1 wherein said boron compound is meta-boric acid.

References Cited

UNITED STATES PATENTS

| | | | |
|---|---|---|---|
| 3,091,627 | 5/1963 | Rudner | 260—639B |
| 3,264,063 | 8/1966 | Carter | 260—643 |
| 3,324,186 | 6/1967 | Olenberg | 260—617H |
| 3,336,390 | 8/1967 | Nelson et al. | 260—631B |
| 3,420,897 | 1/1969 | Russell et al. | 260—631B |
| 3,423,471 | 1/1969 | Golden et al. | 260—639B |
| 3,456,021 | 7/1969 | Winnick et al. | 260—617H |
| 2,557,281 | 6/1961 | Hamblet et al. | 260—617HX |
| 3,232,704 | 2/1966 | Helbig et al. | 260—617HX |

FOREIGN PATENTS

| | | | |
|---|---|---|---|
| 1,018,201 | 10/1952 | France | 260—641 |

OTHER REFERENCES

Robinson et al., "Elements of Fractional Distillation," (1950), pp. 131, 132, 148, 265.

LEON ZITVER, Primary Examiner

J. E. EVANS, Assistant Examiner

U.S. Cl. X.R.

203—76; 260—586, 597, 617, 639